United States Patent
Yamamoto (10) Patent No.: US 7,355,799 B2
(45) Date of Patent: Apr. 8, 2008

(54) PROJECTION LENS AND PROJECTION DISPLAY DEVICE USING THE SAME

(75) Inventor: Chikara Yamamoto, Kodaira (JP)

(73) Assignee: Fujinon Corporation, Saitama City (JP)

( * ) Notice: Subject to any disclaimer, the term of this patent is extended or adjusted under 35 U.S.C. 154(b) by 107 days.

(21) Appl. No.: 11/492,086

(22) Filed: Jul. 25, 2006

(65) Prior Publication Data

US 2007/0024983 A1    Feb. 1, 2007

(30) Foreign Application Priority Data

Jul. 28, 2005    (JP)    ............... 2005-219676

(51) Int. Cl.
G02B 9/00    (2006.01)
G02B 9/04    (2006.01)

(52) U.S. Cl. .................... 359/649; 359/793

(58) Field of Classification Search ........ 359/649–651, 359/793

See application file for complete search history.

(56) References Cited

U.S. PATENT DOCUMENTS 6,471,359 B1    10/2002    Kim et al.
6,822,804 B2    11/2004    Maruyama
2004/0100702 A1*   5/2004    Maruyama ............... 359/649

FOREIGN PATENT DOCUMENTS

JP    2002-365541    12/2002

* cited by examiner

*Primary Examiner*—William C Choi
(74) *Attorney, Agent, or Firm*—Arnold International; Jon W. Henry; Bruce Y. Arnold (57) ABSTRACT

A projection lens includes two lens groups, arranged as follows from the magnification side: a first lens group of negative refractive power, a mask, an aperture stop, and a second lens group of positive refractive power. The projection lens is telecentric or nearly telecentric on the reduction side. Each of the first lens group and the second lens group includes a lens component formed of three lens elements with the middle lens element of each of these lens components having refractive power of opposite sign from the other two lens elements. The distance between the first lens group and the second lens group is large enough for placement of a mirror for folding the optical path of the projection lens. The projection lens satisfies specified conditions regarding focal lengths and spacings of lens surfaces. A projection display device uses the projection lens.

24 Claims, 7 Drawing Sheets

Spherical Aberration
Fig. 6A

Astigmatism
Fig. 6B

Distortion
Fig. 6C

Lateral Color
Fig. 6D

Spherical Aberration
Fig. 7A

Astigmatism
Fig. 7B

Distortion
Fig. 7C

Lateral Color
Fig. 7D

Spherical Aberration
Fig. 8A

Astigmatism
Fig. 8B

Distortion
Fig. 8C

Lateral Color
Fig. 8D

Spherical Aberration
Fig. 9A

Astigmatism
Fig. 9B

Distortion
Fig. 9C

Lateral Color
Fig. 9D

PROJECTION LENS AND PROJECTION DISPLAY DEVICE USING THE SAME

FIELD OF THE INVENTION

The present invention relates to a projection lens for magnifying and projecting display information on light valves, such as liquid crystal display elements, and in particular, relates to a projection lens suitable for a rear-projection display device, such as rear-projection televisions and similar display devices.

BACKGROUND OF THE INVENTION

Conventionally, known projection display devices include front projection display devices in which a projection lens is arranged on the same side as an audience viewing light beams containing information reflected from a reflective display screen, and rear-projection display devices in which a transmissive display screen is arranged between an audience and a projection lens that transmits light beams containing information to the transmissive display screen.

Among these, in rear-projection display devices, such as rear-projection televisions, it is well known to arrange the transmissive display screen in the front of a cabinet that contains a light source and the projection lens facing the screen.

Recently, various projection lenses have been proposed for use in projection display devices housed in cabinets, including those disclosed in Japanese Laid-Open Patent Applications 2002-365541, 2004-177688, and 2003-57540. In such cabinets, a smaller cabinet is preferred. Therefore, there is a demand that the volume of the cabinet be decreased. For this reason, shortening the projection distance, i.e., the distance from the surface of a projection lens that is toward the projection screen to the projection screen enables making the television thinner, but this requires widening the projection field angle of the projection lens. These considerations have led to projection lenses with widened projection field angles, as set forth for example in Japanese Laid-Open Patent Applications 2002-031754, 2004-177688, and 2003-57540.

There is a demand that cabinet-type projection displays be thin and have a low profile. In order to meet such demands, it is considered necessary to miniaturize the entire projection lens system by folding the optical path of the projection lens system by installing a deflector, such as a mirror or a prism, for deflecting the optical path of the projection lens system and reducing the projection distance, that is, the distance from the surface of the projection lens to the screen, by making the projection lens be a wide-angle lens.

Also, in projection displays of the type that form color images using multiple light valves, because a synthesizing unit is required in order to synthesize color light beams from the light valves, a projection lens having a long back focal length is demanded.

Furthermore, along with increasing the resolution of the light valves, significant improvement in the resolution of projection lenses is demanded. Degradation of resolution due to chromatic aberration is of particular concern for wide-angle projection lenses.

Therefore, because simultaneously meeting the various demands is difficult, a projection lens which satisfies the various requirements to a high degree has not yet been realized.

For example, Japanese Laid-Open Patent Applications 2002-365541 and 2004-177688, mentioned above, disclose projection lenses that provide good correction of chromatic aberration and provide a long back focal length by using a lens component with three lens elements, but the disclosed projection lenses do not have enough space for a deflector, such as a mirror, for folding the optical path, which makes it difficult to miniaturize the entire projection lens system.

On the other hand, Japanese Laid-Open Patent Application 2003-57540, mentioned above, discloses a projection lens with adequate space for a deflector. However, because the chromatic aberration correction when using a high-resolution light valve is insufficient, and because the lens element on the magnification side of the projection lens is large, it is difficult to miniaturize the projection lens system.

BRIEF SUMMARY OF THE INVENTION

The present invention relates to a high resolution projection lens that enables arranging a mirror as an optical path deflector, has a construction suitable for miniaturization, has a wide-angle projection, and favorably corrects aberrations, especially chromatic aberrations. The present invention further relates to a projection display device using such a projection lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transverse to the optical axis of the projection lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing lens elements together.

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
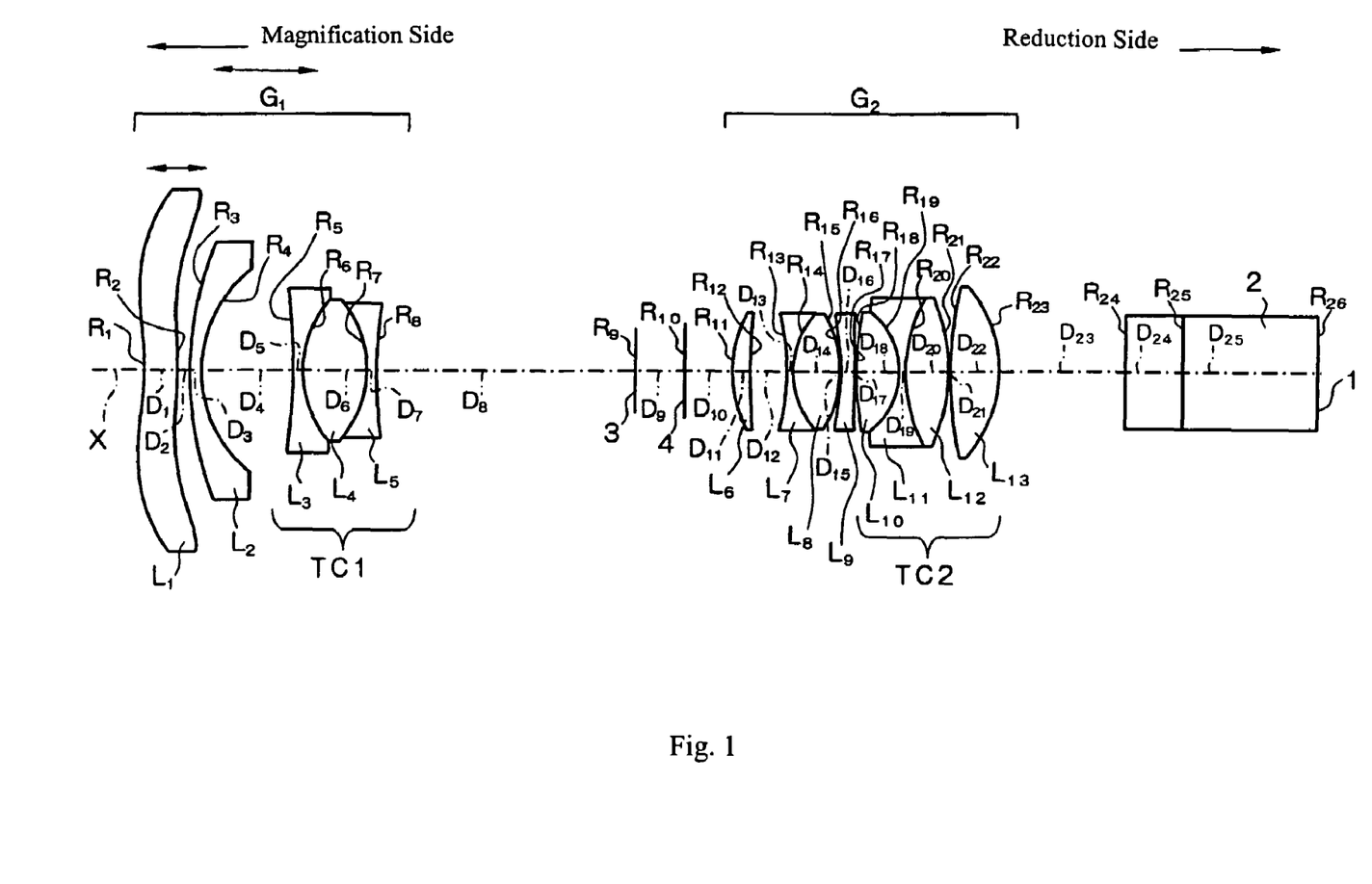
FIG. 1 shows a cross-sectional view of the projection lens of Embodiment 1 of the present invention.

A general description of the projection lens of the present invention that pertains to disclosed embodiments of the invention will now be described with reference to FIG. 1 that shows Embodiment 1. In FIG. 1, a horizontal arrow at the upper left of FIG. 1 that points left indicates the magnification side of the projection lens, and a horizontal arrow at the upper right of FIG. 1 that points right indicates the reduction side of the projection lens. In FIG. 1, lens elements are referenced by the letter L with a subscript number denoting their order from the magnification side of the projection lens along the optical axis X, from $L_1$ to $L_{13}$. Similarly, the radii of curvature of the optical surfaces are referenced by the letter R with a subscript number denoting their order from the magnification side of the projection lens, from $R_1$ to $R_{26}$. The on-axis surface spacings along the optical axis X of the various optical surfaces are referenced by the letter D with a subscript number denoting their order from the magnification side of the projection lens, from $D_1$ to $D_{25}$. In the same manner, two lens groups are labeled $G_1$ and $G_2$ in order from the magnification side of the projection lens, and the optical components belonging to each lens group are indicated by brackets adjacent the labels $G_1$ and $G_2$.

The projection lens of the present invention includes, arranged in order from the magnification side, a first lens group $G_1$ having negative refractive power, a mask 3, an aperture stop 4, and a second lens group $G_2$ having positive refractive power. The projection lens is telecentric or nearly telecentric on the reduction side. The phrase "nearly telecentric" means that slight variations from exact telecentricity may occur at least at some image heights but that the variations remain small in comparison to comparable prior projection lenses that do not include telecentricity in their design criteria. Also, each of the first lens group $G_1$ and the second lens group $G_2$ includes at least one lens component that is formed of three lens elements.

As shown in FIG. 1, in the first lens group $G_1$, a lens component TC1 is formed of a fourth lens element $L_4$ having positive refractive power that is positioned between a third lens element $L_3$ having negative refractive power and a fifth lens element $L_5$ having negative refractive power that is on the reduction side end of the first lens group $G_1$. The first lens group $G_1$ has a first lens element $L_1$ and a second lens element $L_2$ positioned in this order from the magnification side and on the magnification side of the lens component TC1.

As also shown in FIG. 1, in the second lens group $G_2$, a lens component TC2 is formed of an eleventh lens element $L_{11}$ having negative refractive power that is positioned between a tenth lens element $L_{10}$ having positive refractive power and a twelfth lens element $L_{12}$ having positive refractive power. The second lens group $G_2$ includes a sixth lens element $L_6$, a seventh lens element $L_7$, an eighth lens element $L_8$, and a ninth lens element $L_9$ arranged in this order from the magnification side and on the magnification side of the lens component TC2. Additionally, a thirteenth lens element $L_{13}$ is arranged on the reduction side of the lens component TC2, and the seventh lens element $L_7$ and the eighth lens element $L_8$ are joined together to form a lens component.

In the projection lens of FIG. 1, a light beam that is incident from the right side of FIG. 1 and modulated with image information by a light valve 1 enters the projection lens through a glass block 2 and is projected toward the left as a magnified image by the projection lens. Although, for convenience of illustration, only one light valve 1 is shown in FIG. 1, there are projection displays wherein a light beam from a light source is separated into three primary colors with a color separation optical system, with three light valves being installed for the primary colors, making it possible to display full-color images. The three primary colors can be synthesized by installing a color synthesizing device, such as a cross-dichroic prism, in the position of the glass block 2.

Also, in the projection lens of the present invention, the distance along the optical axis X between the first lens group $G_1$ and the second lens group $G_2$ is greater than the distance between any two adjacent optical surfaces of the projection lens.

Additionally, the projection lens of the present invention satisfies the following Conditions (1)-(7):

$-3.5 < f_1/f < -1.2$  Condition (1)

$3.0 < f_2/f < 8.0$  Condition (2)

$3.5 < D_{G1G2}/f$  Condition (3)

$2.5 < Bf/f$  Condition (4)

$-8.0 < f_{TC1}/f < -3.0$  Condition (5)

$-0.15 < f/f_{TC2} < 0.1$  Condition (6)

$1.77 < N_d$  Condition (7)

where
- $f_1$ is the focal length of the first lens group $G_1$;
- $f$ is the focal length of the entire projection lens;
- $f_2$ is the focal length of the second lens group $G_2$;
- $D_{G1G2}$ is the distance along the optical axis between the first lens group $G_1$ and the second lens group $G_2$;
- Bf is the air-equivalent distance along the optical axis between the lens surface on the reduction side of the second lens group $G_2$ and the image plane of the projection lens on the reduction side of the projection lens;
- $f_{TC1}$ is the focal length of a lens component (TC1) of the first lens group $G_1$ that includes three lens elements;
- $f_{TC2}$ is the focal length of a lens component (TC2) of the second lens group $G_2$ that includes three lens elements; and
- $N_d$ is the refractive index at the d-line of the lens element ($L_{11}$) having negative refractive power of the lens component (TC2) formed of three lens elements of the second lens group $G_2$.

Figure 3:
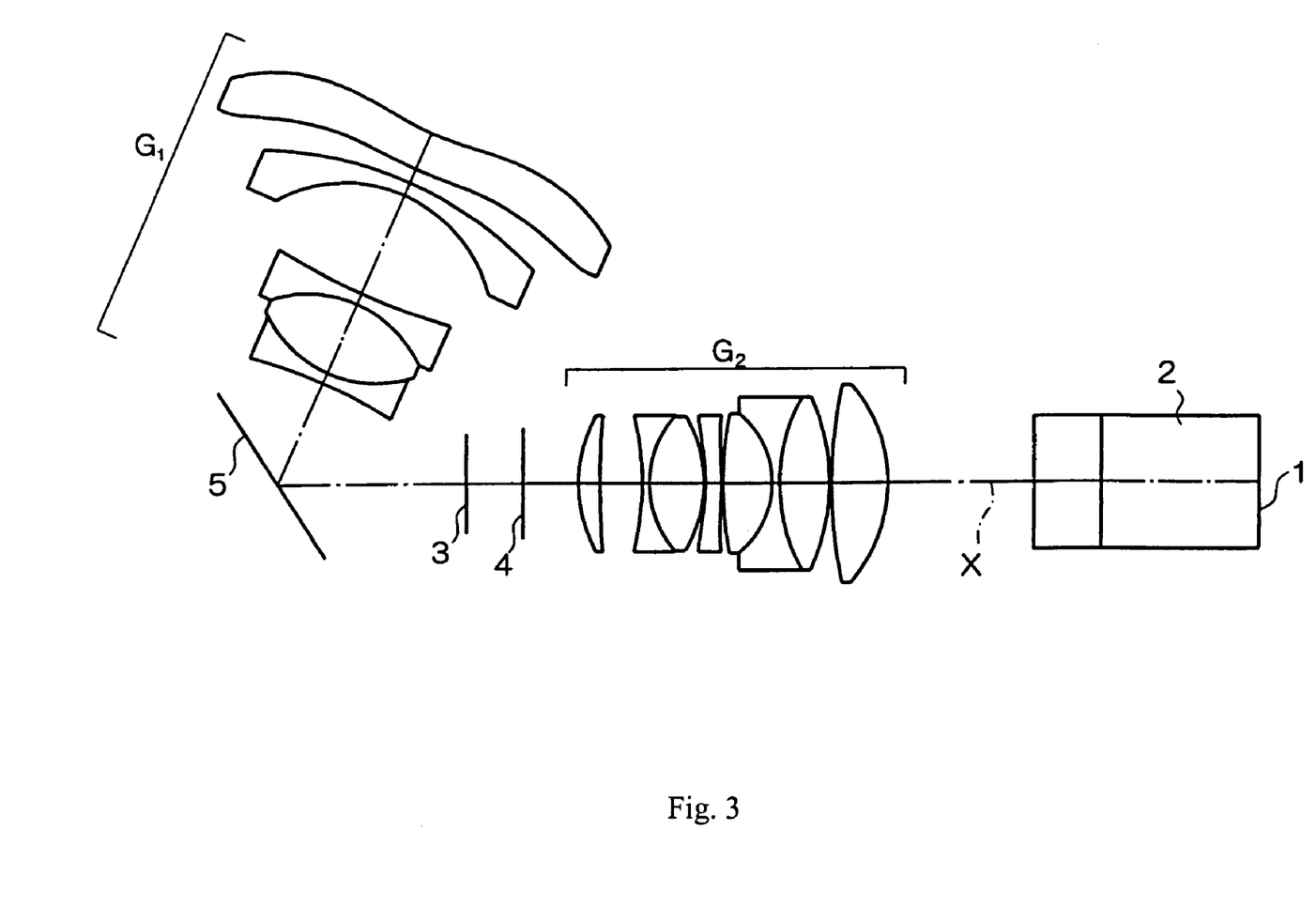
FIG. 3 shows a cross-sectional view of the projection lens of FIG. 1 with a mirror arranged to deflect the optical path.

Additionally, as shown in FIG. 3, a mirror 5 may serve as a deflector to deflect the optical path between the first lens group $G_1$ and the second lens group $G_2$ of the projection lens of FIG. 1.

By constructing the projection lens in the manner described above, the projection lens of the present invention has a construction suitable for miniaturization, that is capable of wide-angle projection, and that provides space for a deflector, such as the mirror 5, as shown in FIG. 3. Also, by this construction, it is possible to favorably correct various aberrations, especially chromatic aberrations, as well as to improve the resolution of the projection lens. Satisfying Conditions (1)-(7), which relate to various relationships between the optical components of the projection lens, has a large influence on achieving the desired results as explained below.

Condition (1) above regulates the ratio of the focal length $f_1$ of the first lens group $G_1$ divided by the focal length of the entire projection lens. If the upper limit of Condition (1) above is not satisfied, the refractive power of the first lens group $G_1$ becomes larger and correcting the aberrations becomes difficult. Also, if the lower limit of Condition (1) above is not satisfied, the refractive power of the first lens group $G_1$ becomes smaller and the first lens group $G_1$ becomes larger.

Condition (2) above regulates the ratio of the focal length $f_2$ of the second lens group $G_2$ divided by the focal length of the entire projection lens. If the lower limit of Condition (2) above is not satisfied, the refractive power of the second lens group $G_2$ becomes larger and correcting aberrations becomes difficult. Also, if the upper limit of Condition (2) above is not satisfied, the refractive power of the second lens group becomes smaller and the second lens group $G_2$ becomes larger.

Figure 4:
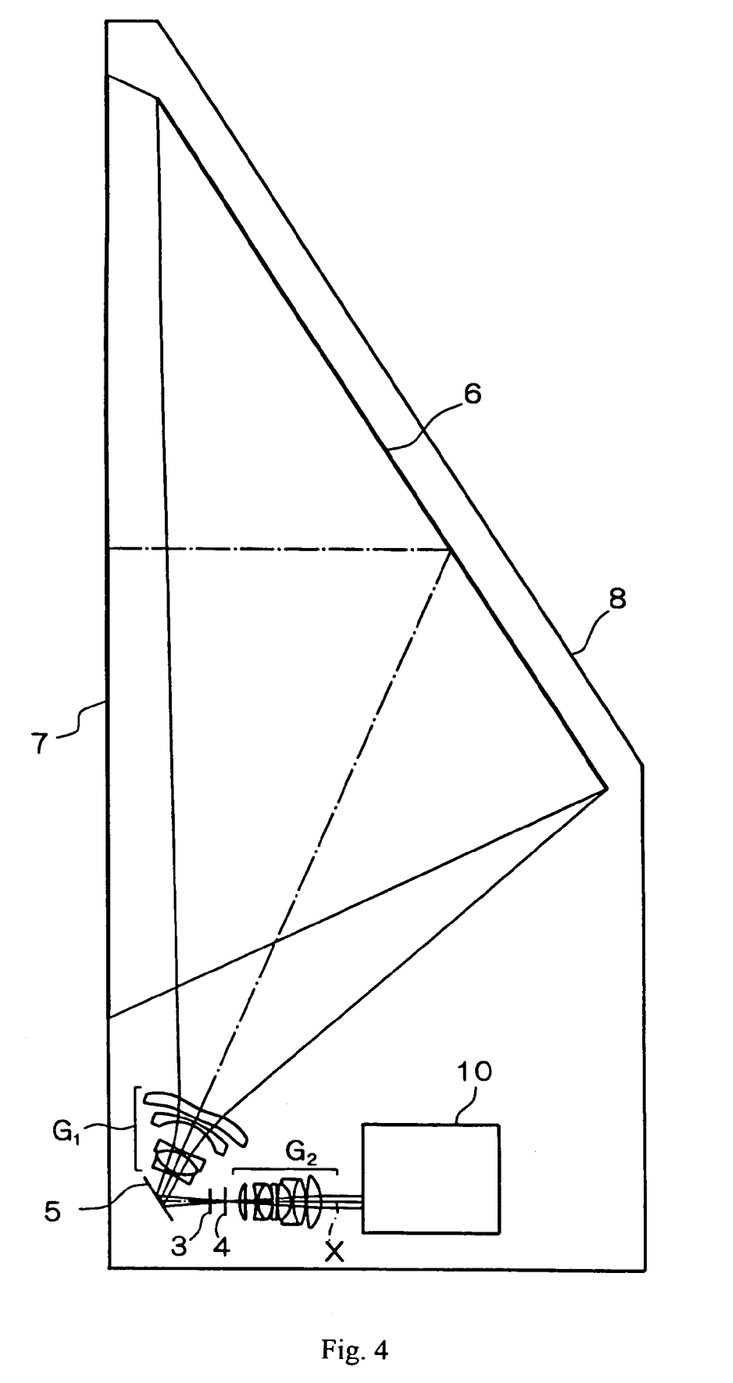
FIG. 4 shows a schematic cross-sectional view of a projection display device using a projection lens of the present invention.

Condition (3) above determines the distance between the first lens group $G_1$ and the second lens group $G_2$ so that a deflector, such as the mirror 5, that deflects the optical path can be installed in order to make the projection lens system more compact. If Condition (3) above is not satisfied, installation of the deflector, such as the mirror 5, becomes difficult and the deflecting (folding) angle of the optical path is limited. Installing the mirror 5 that deflects the light path as shown in FIG. 4 is an effective technique for miniaturizing rear-projection displays.

Condition (4) above regulates the back focal length of the projection lens and limits the back focal length to values that provide space for arranging a prism that can be used for color synthesis, as well as other optical functions, on the reduction side of the projection lens. If Condition (4) above is not satisfied, it becomes difficult to provide space for such a prism.

Condition (5) above regulates the ratio of the focal length $f_{TC1}$ of the lens component TC1, formed of three lens elements, of the first lens group $G_1$ divided by the focal length f of the entire projection lens. If the upper limit of Condition (5) is not satisfied, the refractive power of the lens component TC1 becomes larger and correcting aberrations becomes difficult. Also, if the lower limit of Condition (5) is not satisfied, the refractive power of the lens component TC1 becomes smaller and the first lens group $G_1$ becomes larger.

Condition (6) above regulates the ratio of the focal length f of the entire projection lens divided by the focal length $f_{TC2}$ of the lens component TC2 that is formed of three lens elements of the second lens group $G_2$. If the upper or lower limit of Condition (6) above is not satisfied, the power of the lens component TC2 becomes larger and correcting aberrations becomes difficult.

Condition (7) above regulates the refractive index $N_d$ (at the d-line) of the lens element having negative refractive power (lens element $L_{11}$) of lens component TC2 of the second lens group $G_2$. If Condition (7) above is not satisfied, it becomes difficult to correct chromatic aberrations, especially higher-order chromatic aberrations, due to the lens component TC2 including three lens elements with two joined surfaces, and these aberrations lead to degradation in the optical performance of the projection lens.

Also, in the projection lens of the present invention, because the lens components TC1 and TC2 (each formed of three lens elements) are placed in the first lens group $G_1$ and the second lens group $G_2$, respectively, it is possible to miniaturize the entire projection lens system while favorably correcting chromatic aberrations, especially higher-order chromatic aberrations.

Additionally, in the projection lens of the present invention, the first lens group $G_1$ may include, arranged in order from the magnification side, an aspheric lens element having a small refractive power, a lens element having negative refractive power and a meniscus shape, with its concave surface on the reduction side, and a lens component formed of a biconvex lens element positioned between two lens elements having negative refractive power.

Also, an aspheric lens element $L_1$ is placed on the magnification side of the first lens group $G_1$ which allows for a construction wherein curvature of field that is generated by the change in projection distance is corrected by moving in the optical axis direction the aspheric lens element $L_1$ according to the change in projection distance, and focus adjustment is performed by moving the first lens group $G_1$ along the optical axis of the first lens group $G_1$. In addition, an aspheric lens element is included within the second lens group $G_2$.

The projection display device of the present invention is explained next. FIG. 4 shows a schematic cross-sectional view of a projection display device using a projection lens of the present invention, and FIG. 5 shows a cross-sectional view of the illumination optical system of the projection display device of FIG. 4.

The projection display device shown in FIG. 4 is a rear-projection display that effectively uses a projection lens of the present invention by being equipped with a light source and a light valve that form an illumination optical system, shown as reference symbol 10 in FIG. 4, with a light beam being guided from the light source to the light valve. The illumination optical system 10 and the projection lens are housed in a cabinet 8, and the arrangement is such that the light source is optically modulated by the light valve, and the light beam bearing image information is projected onto the back of a screen 7 placed at a specified distance from the projection lens and a rear mirror 6. An image projected magnified onto the screen 7 is viewed from the front side (the left side of FIG. 4) of the screen 7 by the viewer.

Figure 5:
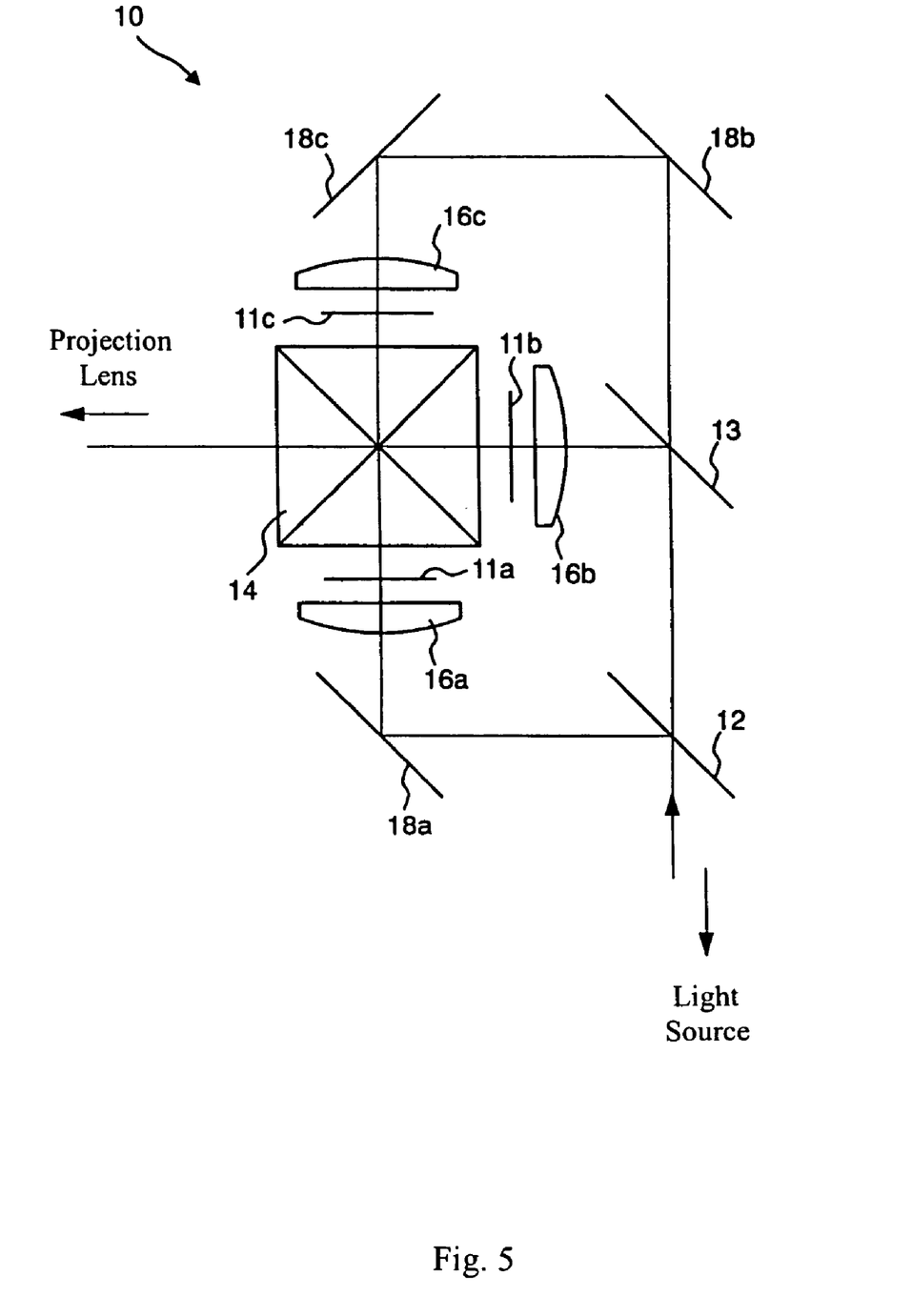
FIG. 5 shows a cross-sectional view of the illumination optical system of the projection display device of FIG. 4.

As shown in FIG. 5, the illumination optical system 10 is equipped with transmissive liquid crystal panels 11a-11c as light valves, dichroic mirrors 12 and 13 for color separation, a cross-dichroic prism 14 for color synthesis, condenser lenses 16a-16c, and totally reflecting mirrors 18a-18c. Although the optical elements used to prepare light sent to the dichroic mirror 12 are not shown in FIG. 5, three color light beams (G light or green light, B light or blue light, and R light or red light), which may be color components of white light from a light source enter the corresponding liquid crystal panels 11a-11c via the illumination optical unit, are optically modulated, and are projected onto the screen 7 by the projection lens shown in FIG. 4.

Because the projection display device uses the projection lens of the present invention, it is possible to obtain large, high-resolution images with chromatic aberrations being favorably corrected. Also, because the projection display device is constructed so that the mirror 5 that deflects the light path is installed between the first lens group $G_1$ and the second lens group $G_2$ of the projection lens so that the light path is bent at an acute angle, the profile and the thickness of the projection display device may be reduced.

Figure 2:
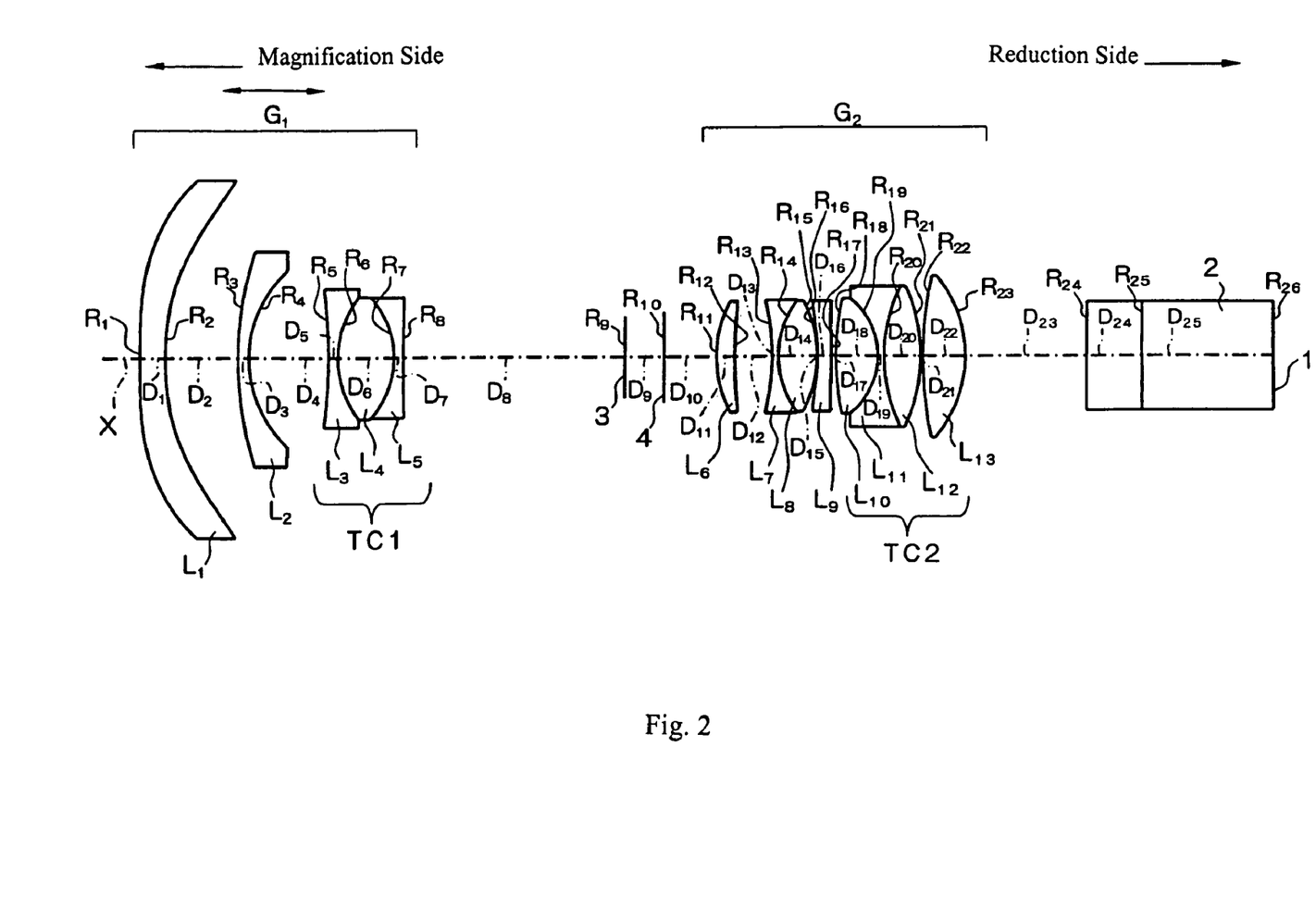
FIG. 2 shows a cross-sectional view of the projection lens of Embodiment 3 of the present invention.

Specific embodiments of the projection lens of the present invention are explained below. In FIG. 2 that shows the composition of Embodiment 3, the same reference symbols are used for elements that similarly perform the same functions as elements of Embodiment 1 as shown in FIG. 1. Four embodiments of the present invention will be individually described below with reference to the drawings.

While embodiments of the present invention discussed herein have constructions using both a lens component TC1 in the first lens group $G_1$ formed of three lens elements and a lens component TC2 in the second lens group $G_2$ formed of three lens elements, respectively, even if only one of the two lens groups includes such a three-element lens component, to a certain degree, similar results can be obtained.

EMBODIMENT 1

FIG. 1 shows a cross-sectional view of the projection lens of Embodiment 1 of the present invention. As shown in FIG. 1, the projection lens of Embodiment 1 includes, arranged in order from the magnification side, a first lens group $G_1$ having negative refractive power, a mask 3, an aperture stop 4, and a second lens group $G_2$ having positive refractive power. The projection lens is telecentric or nearly telecentric on the reduction side of the projection lens.

The first lens group $G_1$ includes, arranged in order from the magnification side, a first lens element $L_1$ having little refractive power and including at least one aspheric surface, a second lens component $L_2$ having a negative meniscus shape with its concave surface on the reduction side, and a lens component TC1 formed of three lens elements, namely, a biconvex fourth lens element $L_4$ that is positioned between two lens elements $L_3$ and $L_5$ that have negative refractive power.

On the other hand, the second lens group $G_2$ includes, arranged in order from the magnification side, a sixth lens element $L_6$ having positive refractive power and a meniscus shape with its convex surface on the magnification side, a biconcave seventh lens element $L_7$, a biconvex eighth lens element $L_8$, a ninth lens element $L_9$ having two aspheric surfaces and a convex surface on the reduction side, the lens component TC2 that includes the eleventh lens element $L_{11}$ having negative refractive power that is positioned between tenth and twelfth lens elements $L_{10}$ and $L_{12}$ having positive refractive power, and a thirteenth lens element $L_{13}$ that is biconvex. The seventh lens element $L_7$ and the eighth lens element $L_8$ are joined together to form a lens component.

In the first lens element $L_1$ and the ninth lens element $L_9$ that each include an aspheric surface, either surface of each lens element may be aspheric and achieve desired effects, but it is preferable that both these lens elements have both surfaces being aspheric surfaces. The lens surface or surfaces that are aspheric are defined using the following equation:

$$Z=[(Y^2/R)/\{1+(1-K\cdot Y^2/R^2)^{1/2}\}]+\Sigma(A_i\cdot Y^i) \qquad \text{Equation (A)}$$

where
- Z is the length (in mm) of a line drawn from a point on the aspheric lens surface at a distance Y from the optical axis to the tangential plane of the aspheric surface vertex,
- R is the radius of curvature (in mm) of the aspheric lens surface on the optical axis,
- Y is the distance (in mm) from the optical axis,
- K is the eccentricity, and
- $A_i$ is the ith aspheric coefficient, and the summation extends over i.

In embodiments of the invention disclosed below, only aspheric coefficients $A_3$-$A_{11}$ are non-zero, and sometimes some of these aspheric coefficients are also zero.

Although the projection lens of Embodiment 1 is constructed so as to satisfy Conditions (1)-(7) above, it is preferable to further limit Conditions (2)-(4) above to ranges of values defined by Conditions (8)-(10) below corresponding respectively to Condition (2)-(4) above, and which Embodiment 1 also satisfies:

$5.0 < f_2/f < 8.0$      Condition (8)

$6.0 < D_{G1G2}/f$      Condition (9)

$4.0 < Bf/f$      Condition (10)

where
$f_2$, $f$, $D_{G1G2}$, and $Bf$ are defined as described above.

FIG. 1 shows a light valve 1 and a glass block 2. The projection lens of Embodiment 1 has a distance between the first lens group $G_1$ and the second lens group $G_2$ in which a mirror 5 that deflects the light path can be installed, as shown in FIG. 3. Because the projection lens is constructed so as be telecentric or nearly telecentric on the reduction side, it is also preferable to construct the projection lens with the color synthesizer being part of the glass block 2.

Also, the projection lens of Embodiment 1 is constructed so that the aspheric lens element $L_1$ of the first lens group $G_1$ may be moved along the optical axis X within the first lens group $G_1$ (shown by a double-headed horizontal arrow above lens element $L_1$ in FIG. 1) in order to correct for curvature of field resulting from the change in the projection distance associated with movement of the first lens group $G_1$ along the optical axis X for focus adjustment (shown by a double-headed horizontal arrow above reference symbol $G_1$ in FIG. 1).

Table 1 below lists the surface number # in order from the magnification side, the radius of curvature R of each surface on the optical axis, the on-axis surface spacing D, that is, the separation of adjacent optical surfaces along the optical axis, as well as the refractive index $N_d$ and the Abbe number $v_d$ (both at the d-line of 587.6 nm) of each optical element for Embodiment 1. The numerical values of R and D are based on a normalized focal length of 1 for the projection lens of Embodiment 1. Note that, although R is the on-axis radius of curvature, for convenience of illustration in FIG. 1 the lead lines from the R reference symbols extend to the surfaces being referenced but do not extend to the on-axis positions.

Also, as described above, the projection lens of Embodiment 1 is constructed so that the first lens $L_1$ moves along the optical axis X according to the change in the projection distance. The lower portion of Table 1 lists various projection distances P along the optical axis between a conjugate image on the magnification side and the magnification-side surface of the first lens element $L_1$ versus corresponding distances $D_2$ along the optical axis between the first lens element $L_1$ and the second lens element $L_2$ that have been adjusted in order to correct for the curvature of field at the given projection distance P. The normalized focal length of 1 for the projection lens of Embodiment 1 is based on a value of $D_2$ being equal to 0.3307, which is shown as one of the values of $D_2$ at the bottom of Table 1.

TABLE 1

| # | R | D | $N_d$ | $v_d$ |
|---|---|---|---|---|
| 1* | −5.1859 | 0.8738 | 1.49100 | 57.6 |
| 2* | −7.7554 | $D_2$ (variable) | | |
| 3 | 8.8390 | 0.2996 | 1.80518 | 25.4 |
| 4 | 3.3607 | 2.3917 | | |
| 5 | −15.5949 | 0.2497 | 1.67790 | 55.3 |
| 6 | 2.7925 | 1.6777 | 1.62004 | 36.3 |
| 7 | −2.7925 | 0.2497 | 1.80400 | 46.6 |
| 8 | 11.4130 | 6.7725 | | |
| 9 | ∞ (mask) | 1.2857 | | |
| 10 | ∞ (stop) | 1.2424 | | |
| 11 | 3.2018 | 0.4656 | 1.84666 | 23.8 |
| 12 | 17.1380 | 0.9549 | | |
| 13 | −6.2251 | 0.1623 | 1.80400 | 46.6 |
| 14 | 2.2228 | 1.2433 | 1.49700 | 81.6 |
| 15 | −2.9177 | 0.0350 | | |
| 16* | −4.4133 | 0.3595 | 1.49100 | 57.6 |
| 17* | −11.2617 | 0.0300 | | |
| 18 | 7.7554 | 1.1272 | 1.49700 | 81.6 |
| 19 | −1.9810 | 0.1685 | 1.83400 | 37.2 |
| 20 | 3.9519 | 1.1185 | 1.51633 | 64.1 |
| 21 | −4.6998 | 0.0512 | | |
| 22 | 10.5265 | 1.2645 | 1.49700 | 81.6 |
| 23 | −3.3610 | 3.2855 | | |
| 24 | ∞ | 1.4979 | 1.83500 | 43.0 |
| 25 | ∞ | 3.5326 | 1.51680 | 64.2 |
| 26 | ∞ | | | |
| P | 68.2028 | 82.1354 | 99.5442 | 116.9275 |
| $D_2$ | 0.3569 | 0.3307 | 0.3145 | 0.3007 |

The lens surfaces with a * to the right of the surface number in Table 1 are aspheric lens surfaces, and the aspheric shapes of these lens surfaces are expressed by Equation (A) above.

The lens surfaces with a * to the right of the surface number in Table 1 are aspheric lens surfaces, and the aspheric surface shapes of these lens surfaces are expressed by Equation (A) above.

Table 2 below lists the values of the constant K and the aspheric coefficients $A_3$-$A_{11}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 1 | 1.0000 | 1.7853E−2 | 1.2268E−2 | −2.6634E−3 | −3.0901E−4 |
| 2 | −3.0091 | 1.7379E−2 | 8.9201E−3 | −2.2420E−3 | −5.6856E−5 |
| 16 | 1.0000 | 0.0000 | 1.7505E−2 | 0.0000 | 1.0052E−3 |
| 17 | 1.0000 | 0.0000 | 1.7941E−2 | 0.0000 | 5.1410E−4 |

| # | $A_7$ | $A_8$ | $A_9$ | $A_{10}$ | $A_{11}$ |
|---|---|---|---|---|---|
| 1 | 1.7710E−4 | −1.2011E−5 | −1.9649E−6 | 1.8421E−7 | 1.6701E−8 |
| 2 | 1.1109E−5 | −1.3933E−6 | 2.7490E−6 | −6.3434E−8 | −6.7966E−8 |

TABLE 2-continued

| | | | | |
|---|---|---|---|---|
| 16 | 0.0000 | −7.1189E−4 | 0.0000 | 4.5017E−4 | 0.0000 |
| 17 | 0.0000 | −7.3609E−4 | 0.0000 | 3.2936E−4 | 0.0000 |

The projection lens of Embodiment 1 satisfies Conditions (1)-(7) above, as well as Conditions (8)-(10) above, as set forth in Table 3 below.

TABLE 3

| Condition No. | Condition | Value |
|---|---|---|
| (1) | $-3.5 < f_1/f < -1.2$ | −1.88 |
| (2), (8) | $3.0 < f_2/f < 8.0$ $5.0 < f_2/f < 8.0$ | 6.32 |
| (3), (9) | $3.5 < D_{G1G2}/f$ $6.0 < D_{G1G2}/f$ | 9.30 |
| (4), (10) | $2.5 < Bf/f$ $4.0 < Bf/f$ | 6.43 |
| (5) | $-8.0 < f_{TC1}/f < -3.0$ | −4.72 |
| (6) | $-0.15 < f/f_{TC2} < 0.1$ | −0.06 |
| (7) | $1.77 < N_d$ | 1.834 |

Figure 6A:
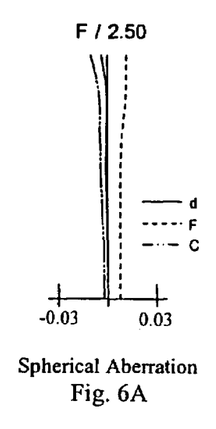
FIGS. 6A-6D show the spherical aberration, astigmatism, distortion, and lateral color, respectively, of the projection lens of Embodiment 1 of the present invention.
Figure 6B:
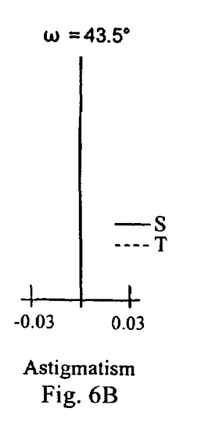
Figure 6C:
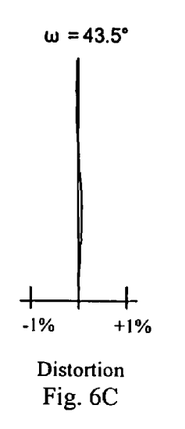
Figure 6D:
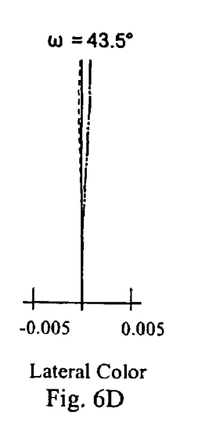

FIGS. 6A-6D show the spherical aberration, the astigmatism, the distortion (in %), and the lateral color, respectively, of the projection lens of Embodiment 1. In FIG. 6A, the spherical aberration is shown for the d-line (λ=587.6 nm), the F-line (λ=486.1 nm), and the C-line (λ=656.3 nm) at a maximum f-number of 2.50. FIGS. 6B-6D show the astigmatism, distortion, and lateral color, respectively, at a half-field angle of 43.5 degrees. In FIG. 6B, the astigmatism is shown for both the sagittal image surface S and the tangential image surface T for the d-line (λ=587.6 nm). In FIG. 6D, the lateral color is shown for the F-line (λ=486.1 nm) and the C-line (λ=656.3 nm) relative to the d-line (λ=587.6 nm).

As is clear from FIGS. 6A-6D, the projection lens of Embodiment 1 provides a wide-angle half-field angle of 43.5 degrees, a bright projection with a maximum f-number of 2.50, and favorably corrects aberrations, including distortion and lateral color.

EMBODIMENT 2

Embodiment 2 is very similar to Embodiment 1. Therefore, FIG. 1 serves to also illustrate Embodiment 2 and a description of features shared with Embodiment 1 is omitted below. Embodiment 2 differs from Embodiment 1 in that the projection distance P is fixed in Embodiment 2 and therefore the aspheric lens, the first lens element $L_1$, is also fixed within the first lens group $G_1$.

Table 4 below lists the surface number # in order from the magnification side, the radius of curvature R of each surface on the optical axis, the on-axis surface spacing D, that is, the separation of adjacent optical surfaces along the optical axis, as well as the refractive index Nd and the Abbe number $v_d$ (both at the d-line of 587.6 nm) of each optical element for Embodiment 2. The numerical values of R and D are based on a normalized focal length of 1 for the projection lens of Embodiment 2. Note that, although R is the on-axis radius of curvature, for convenience of illustration in FIG. 1 the lead lines from the R reference symbols extend to the surfaces being referenced but do not extend to the on-axis positions. In Embodiment 2, the projection distance P between the conjugate image on the magnification side and the magnification-side face of the first lens element $L_1$ along the optical axis is 81.8724.

TABLE 4

| # | R | D | $N_d$ | $v_d$ |
|---|---|---|---|---|
| 1* | −6.0910 | 0.9959 | 1.49100 | 57.6 |
| 2* | −6.5821 | 0.7978 | | |
| 3 | 27.7521 | 0.2988 | 1.80517 | 25.4 |
| 4 | 3.3337 | 2.7599 | | |
| 5 | −12.0344 | 0.2490 | 1.80400 | 46.6 |
| 6 | 2.6220 | 1.8151 | 1.64769 | 33.8 |
| 7 | −2.4694 | 0.2490 | 1.67790 | 55.3 |
| 8 | 17.9516 | 5.7900 | | |
| 9 | ∞ (mask) | 1.4939 | | |
| 10 | ∞ (stop) | 0.9618 | | |
| 11 | 3.7471 | 0.5177 | 1.84665 | 23.8 |
| 12 | 21.0862 | 1.2037 | | |
| 13 | −9.6146 | 0.1618 | 1.80400 | 46.6 |
| 14 | 2.4561 | 0.9152 | 1.49700 | 81.6 |
| 15 | −4.6058 | 0.0584 | | |
| 16* | −6.4691 | 0.3785 | 1.49100 | 57.6 |
| 17* | −12.1238 | 0.0249 | | |
| 18 | 7.6396 | 1.1041 | 1.49700 | 81.6 |
| 19 | −2.0514 | 0.1681 | 1.83400 | 37.2 |
| 20 | 5.1250 | 1.1679 | 1.49700 | 81.6 |
| 21 | −3.9486 | 0.0250 | | |
| 22 | 12.2053 | 1.1992 | 1.48749 | 70.2 |
| 23 | −3.5860 | 3.2746 | | |
| 24 | ∞ | 1.4939 | 1.83500 | 43.0 |
| 25 | ∞ | 3.5231 | 1.51680 | 64.2 |
| 26 | ∞ | | | |

The lens surfaces with a * to the right of the surface number in Table 4 are aspheric lens surfaces, and the aspheric shapes of these lens surfaces are expressed by Equation (A) above.

The lens surfaces with a * to the right of the surfaces number in Table 4 are aspheric lens surfaces, and the aspheric surfaces shapes of these lens surfaces are expressed by Equation (A) above.

Table 5 below lists the values of the constant K and the aspheric coefficients $A_3$-$A_{11}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_3$ | $A_4$ | $A_5$ | $A_6$ |
|---|---|---|---|---|---|
| 1 | 1.0000 | 1.4873E−2 | 1.0694E−2 | −2.6547E−3 | −2.1133E−4 |
| 2 | 0.1136 | 1.8763E−2 | 6.6540E−3 | −1.9959E−3 | 6.1157E−5 |

TABLE 5-continued

| 16 | 1.0000 | 0.0000 | 1.3509E−2 | 0.0000 | 4.4179E−5 |
| 17 | 1.0000 | 0.0000 | 1.3788E−2 | 0.0000 | 2.6242E−5 |

| # | $A_7$ | $A_8$ | $A_9$ | $A_{10}$ | $A_{11}$ |
|---|---|---|---|---|---|
| 1 | 1.8337E−4 | −1.7529E−5 | −2.3034E−6 | 3.7216E−7 | 3.0633E−9 |
| 2 | 1.4541E−5 | −3.5051E−6 | 1.8022E−6 | −2.0381E−7 | −3.1761E−9 |
| 16 | 0.0000 | 3.1645E−4 | 0.0000 | 5.5439E−5 | 0.0000 |
| 17 | 0.0000 | −1.6683E−5 | 0.0000 | 7.3269E−5 | 0.0000 |

The projection lens of Embodiment 2 satisfies Conditions (1)-(7) above, as well as Conditions (8)-(10) above, as set forth in Table 6 below.

TABLE 6

| Condition No. | Condition | Value |
|---|---|---|
| (1) | $-3.5 < f_1/f < -1.2$ | −1.81 |
| (2), (8) | $3.0 < f_2/f < 8.0$ | 6.31 |
| | $5.0 < f_2/f < 8.0$ | |
| (3), (9) | $3.5 < D_{G1G2}/f$ | 8.25 |
| | $6.0 < D_{G1G2}/f$ | |
| (4), (10) | $2.5 < Bf/f$ | 6.41 |
| | $4.0 < Bf/f$ | |
| (5) | $-8.0 < f_{TC1}/f < -3.0$ | −5.40 |
| (6) | $-0.15 < f/f_{TC2} < 0.1$ | −0.02 |
| (7) | $1.77 < N_d$ | 1.834 |

Figure 7A:
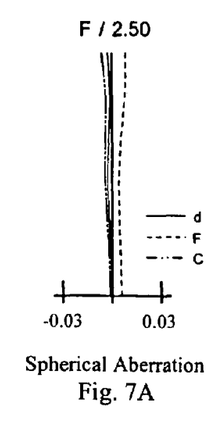
FIGS. 7A-7D show the spherical aberration, astigmatism, distortion, and lateral color, respectively, of the projection lens of Embodiment 2 of the present invention.
Figure 7B:
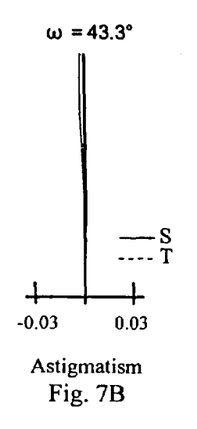
Figure 7C:
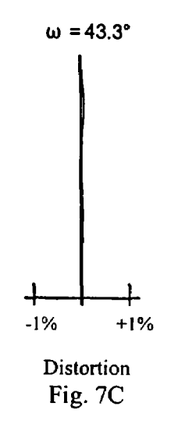
Figure 7D:
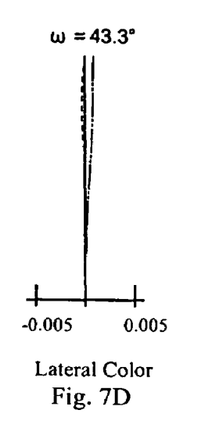

FIGS. 7A-7D show the spherical aberration, the astigmatism, the distortion (in %), and the lateral color, respectively, of the projection lens of Embodiment 2. In FIG. 7A, the spherical aberration is shown for the d-line (λ=587.6 nm), the F-line (λ=486.1 nm), and the C-line (k=656.3 nm) at a maximum f-number of 2.50. FIGS. 7B-7D show the astigmatism, distortion, and lateral color, respectively, at a half-field angle of 43.3 degrees. In FIG. 7B, the astigmatism is shown for both the sagittal image surface S and the tangential image surface T for the d-line (λ=587.6 nm). In FIG. 7D, the lateral color is shown for the F-line (λ=486.1 nm) and the C-line (λ=656.3 nm) relative to the d-line (λ=587.6 nm).

As is clear from FIGS. 7A-7D, the projection lens of Embodiment 2 provides a wide-angle half-field angle of 43.3 degrees, a bright projection with a maximum f-number of 2.50, and favorably corrects aberrations, including distortion and lateral color.

EMBODIMENT 3

FIG. 2 shows a cross-sectional view of the projection lens of Embodiment 3 of the present invention. Embodiment 3 is very similar to Embodiment 1 and therefore a description of features shared with Embodiment 1 is omitted below. Embodiment 3 differs from Embodiment 1 in that the projection distance P is fixed in Embodiment 3 and therefore an aspheric lens, the first lens element $L_1$, is also fixed within the first lens group $G_1$.

Table 5 below lists the surface number # in order from the magnification side, the radius of curvature R of each surface on the optical axis, the on-axis surface spacing D, that is, the separation of adjacent optical surfaces along the optical axis, as well as the refractive index $N_d$ and the Abbe number $v_d$ (both at the d-line of 587.6 nm) of each optical element for Embodiment 3. The numerical values of R and D are based on a normalized focal length of 1 for the projection lens of Embodiment 3. Note that, although R is the on-axis radius of curvature, for convenience of illustration in FIG. 2 the lead lines from the R reference symbols extend to the surfaces being referenced but do not extend to the on-axis positions. In Embodiment 3, the projection distance P between the conjugate image on the magnification side and the magnification-side face of the first lens element $L_1$ along the optical axis is 81.2078.

TABLE 7

| # | R | D | $N_d$ | $v_d$ |
|---|---|---|---|---|
| 1* | ∞ | 0.6869 | 1.49100 | 57.6 |
| 2* | 10.3637 | 1.9606 | | |
| 3 | 9.1302 | 0.2997 | 1.80517 | 25.4 |
| 4 | 3.1861 | 2.1960 | | |
| 5 | −14.5376 | 0.2497 | 1.80400 | 46.6 |
| 6 | 2.6853 | 1.5198 | 1.63980 | 34.5 |
| 7 | −2.4484 | 0.2497 | 1.80400 | 46.6 |
| 8 | 89.9520 | 5.9937 | | |
| 9 | ∞ (mask) | 1.0614 | | |
| 10 | ∞ (stop) | 1.4162 | | |
| 11 | 3.2518 | 0.4864 | 1.84665 | 23.8 |
| 12 | 14.3270 | 1.0000 | | |
| 13 | −6.5955 | 0.1623 | 1.80400 | 46.6 |
| 14 | 2.5515 | 1.0306 | 1.49700 | 81.6 |
| 15 | −3.2642 | 0.0250 | | |
| 16* | −4.8716 | 0.3744 | 1.49100 | 57.6 |
| 17* | −12.1605 | 0.1217 | | |
| 18 | 7.1632 | 1.1537 | 1.49700 | 81.6 |
| 19 | −1.9820 | 0.1686 | 1.83400 | 37.2 |
| 20 | 4.3375 | 0.9838 | 1.51633 | 64.1 |
| 21 | −4.6111 | 0.0625 | | |
| 22 | 10.1796 | 1.1474 | 1.49700 | 81.6 |
| 23 | −3.4273 | 3.2803 | | |
| 24 | ∞ | 1.4984 | 1.83500 | 43.0 |
| 25 | ∞ | 3.5338 | 1.51680 | 64.2 |
| 26 | ∞ | | | |

The lens surfaces with a * to the right of the surface number in Table 7 are aspheric lens surfaces, and the aspheric shapes of these lens surfaces are expressed by Equation (A) above.

The lens surfaces with a * to the right of the surfaces number in Table 7 are aspheric lens surfaces, and the aspheric surfaces shapes of these lens surfaces are expressed by Equation (A) above.

Table 8 below lists the values of the constant K and the aspheric coefficients $A_3$-$A_{11}$ used in Equation (A) above for each of the aspheric lens surfaces of Table 7. Aspheric coefficients that are not present in Table 8 are zero. An "E" in the data indicates that the number following the "E" is the exponent to the base 10. For example, "1.0E−2" represents the number $1.0 \times 10^{-2}$.

TABLE 8

| # | K | $A_3$ | $A_4$ | $A_5$ | $A_6$ |
|---|---|---|---|---|---|
| 1 | 1.0000 | 1.9977E−7 | 1.0935E−2 | −2.4634E−3 | −2.7147E−4 |
| 2 | −0.1079 | 3.3301E−3 | 7.8639E−3 | −2.0224E−3 | 1.5458E−5 |
| 16 | 1.0000 | 0.0000 | 1.4662E−2 | 0.0000 | 2.1671E−4 |
| 17 | 1.0000 | 0.0000 | 1.5981E−2 | 0.0000 | −6.0264E−5 |

| # | $A_7$ | $A_8$ | $A_9$ | $A_{10}$ | $A_{11}$ |
|---|---|---|---|---|---|
| 1 | 1.7130E−4 | −1.3388E−5 | −1.9929E−6 | 2.3634E−7 | 6.6699E−9 |
| 2 | 2.1341E−5 | −3.5084E−6 | 1.8556E−6 | −1.9641E−7 | −8.9998E−9 |
| 16 | 0.0000 | 1.9053E−4 | 0.0000 | 9.5129E−5 | 0.0000 |
| 17 | 0.0000 | 6.5092E−5 | 0.0000 | 6.6905E−5 | 0.0000 |

The projection lens of Embodiment 3 satisfies Conditions (1)-(7) above, as well as Conditions (8)-(10) above, as set forth in Table 9 below.

TABLE 9

| Condition No. | Condition | Value |
|---|---|---|
| (1) | $-3.5 < f_1/f < -1.2$ | −1.77 |
| (2), (8) | $3.0 < f_2/f < 8.0$ | 6.19 |
|  | $5.0 < f_2/f < 8.0$ |  |
| (3), (9) | $3.5 < D_{G1G2}/f$ | 8.42 |
|  | $6.0 < D_{G1G2}/f$ |  |
| (4), (10) | $2.5 < Bf/f$ | 6.43 |
|  | $4.0 < Bf/f$ |  |
| (5) | $-8.0 < f_{TC1}/f < -3.0$ | −4.95 |
| (6) | $-0.15 < f/f_{TC2} < 0.1$ | −0.04 |
| (7) | $1.77 < N_d$ | 1.834 |

Figure 8A:
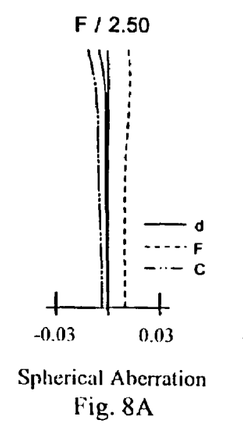
FIGS. 8A-8D show the spherical aberration, astigmatism, distortion, and lateral color, respectively, of the projection lens of Embodiment 3 of the present invention.
Figure 8B:
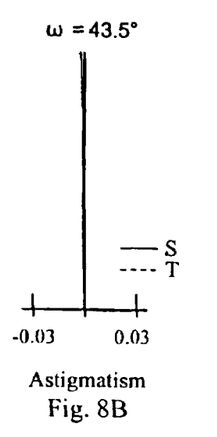
Figure 8C:
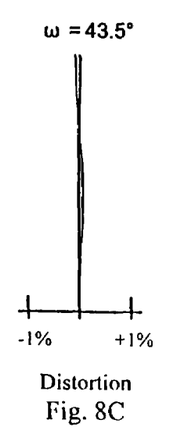
Figure 8D:
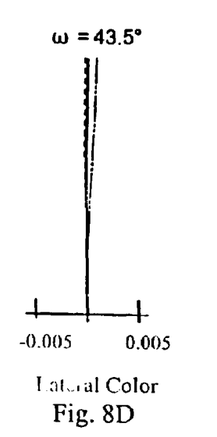

FIGS. 8A-8D show the spherical aberration, the astigmatism, the distortion (in %), and the lateral color, respectively, of the projection lens of Embodiment 3. In FIG. 8A, the spherical aberration is shown for the d-line (λ=587.6 nm), the F-line (λ=486.1 nm), and the C-line (λ=656.3 nm) at a maximum f-number of 2.50. FIGS. 8B-8D show the astigmatism, distortion, and lateral color, respectively, at a half-field angle of 43.5 degrees. In FIG. 8B, the astigmatism is shown for both the sagittal image surface S and the tangential image surface T for the d-line (λ=587.6 nm). In FIG. 8D, the lateral color is shown for the F-line (λ=486.1 nm) and the C-line (λ=656.3 nm) relative to the d-line (λ=587.6 nm).

As is clear from FIGS. 8A-8D, the projection lens of Embodiment 3 provides a wide-angle half-field angle of 43.5 degrees, a bright projection with a maximum f-number of 2.50, and favorably corrects aberrations, including distortion and lateral color.

EMBODIMENT 4

Embodiment 4 is very similar to Embodiment 3, shown in FIG. 2, and therefore a description of features shared with Embodiment 3 is omitted below. Like Embodiment 3, Embodiment 4 differs from Embodiment 1 in that the projection distance P is fixed in Embodiment 4 and therefore an aspheric lens, the first lens element $L_1$, is also fixed within the first lens group $G_1$.

Table 10 below lists the surface number # in order from the magnification side, the radius of curvature R of each surface on the optical axis, the on-axis surface spacing D, that is, the separation of adjacent optical surfaces along the optical axis, as well as the refractive index $N_d$ and the Abbe number $v_d$ (both at the d-line of 587.6 nm) of each optical element for Embodiment 4. The numerical values of R and D are based on a normalized focal length of 1 for the projection lens of Embodiment 4. Note that, although R is the on-axis radius of curvature, for convenience of illustration in FIG. 2 the lead lines from the R reference symbols extend to the surfaces being referenced but do not extend to the on-axis positions. In Embodiment 4, the projection distance P between the conjugate image on the magnification side and the magnification-side face of the first lens element $L_1$ along the optical axis is 81.3616.

TABLE 10

| # | R | D | $N_d$ | $v_d$ |
|---|---|---|---|---|
| 1* | ∞ | 0.8689 | 1.49100 | 57.6 |
| 2* | 11.6976 | 1.1922 |  |  |
| 3 | 6.5386 | 0.2998 | 1.80517 | 25.4 |
| 4 | 2.9741 | 2.0399 |  |  |
| 5 | −58.2045 | 0.2498 | 1.77250 | 49.6 |
| 6 | 2.6208 | 1.5989 | 1.62588 | 35.7 |
| 7 | −3.1504 | 0.2498 | 1.80400 | 46.6 |
| 8 | 9.0778 | 6.9389 |  |  |
| 9 | ∞ (mask) | 1.1867 |  |  |
| 10 | ∞ (stop) | 1.0501 |  |  |
| 11 | 3.3158 | 0.4803 | 1.84665 | 23.8 |
| 12 | 21.3133 | 0.9708 |  |  |
| 13 | −6.0931 | 0.1624 | 1.80400 | 46.6 |
| 14 | 2.3791 | 1.1644 | 1.49700 | 81.6 |
| 15 | −2.8852 | 0.0250 |  |  |
| 16* | −4.5561 | 0.3741 | 1.49100 | 57.6 |
| 17* | −12.1650 | 0.0250 |  |  |
| 18 | 8.1243 | 1.0703 | 1.49700 | 81.6 |
| 19 | −1.9828 | 0.1686 | 1.83400 | 37.2 |
| 20 | 4.0303 | 0.9981 | 1.48749 | 70.2 |
| 21 | −4.5083 | 0.0626 |  |  |
| 22 | 10.0221 | 1.2083 | 1.49700 | 81.6 |
| 23 | −3.2706 | 3.2826 |  |  |
| 24 | ∞ | 1.4990 | 1.83500 | 43.0 |
| 25 | ∞ | 3.5351 | 1.51680 | 64.2 |
| 26 | ∞ |  |  |  |

The lens surfaces with a * to the right of the surface number in Table 10 are aspheric lens surfaces, and the aspheric shapes of these lens surfaces are expressed by Equation (A) above.

The lens surfaces with a * to the right of the surfaces number in Table 10 are aspheric lens surfaces, and the aspheric surfaces shapes of these lens surfaces are expressed by Equation (A) above.

Table 11 below lists the values of the constant K and the aspheric coefficients $A_3$-$A_{11}$ used in Equation (A) above for each of the aspheric lens surfaces of Table 10. Aspheric coefficients that are not present in Table 11 are zero. An "E"

in the data indicates that the number following the "E" is the exponent to the base 10. For example, "1.0E-2" represents the number $1.0 \times 10^{-2}$.

TABLE 11

| # | K | $A_3$ | $A_4$ | $A_5$ | $A_6$ |
|---|---|---|---|---|---|
| 1 | −147.9081 | 2.5756E−4 | 7.6571E−3 | −1.7172E−3 | −2.1524E−4 |
| 2 | −0.2324 | 5.7968E−4 | 6.9281E−3 | −2.2845E−3 | 5.2799E−5 |
| 16 | 1.0000 | 0.0000 | 1.3376E−2 | 0.0000 | −1.8188E−4 |
| 17 | 1.0000 | 0.0000 | 1.5008E−2 | 0.0000 | −3.4795E−4 |

| # | $A_7$ | $A_8$ | $A_9$ | $A_{10}$ | $A_{11}$ |
|---|---|---|---|---|---|
| 1 | 1.4632E−4 | −1.7353E−5 | −1.5775E−6 | 5.2827E−7 | −3.5084E−8 |
| 2 | 4.3642E−5 | −3.6897E−6 | 8.9261E−7 | −2.4890E−7 | 1.5527E−8 |
| 16 | 0.0000 | 7.8196E−5 | 0.0000 | 1.9514E−4 | 0.0000 |
| 17 | 0.0000 | −1.8341E−5 | 0.0000 | 1.2016E−4 | 0.0000 |

The projection lens of Embodiment 4 satisfies Conditions (1)-(7) above, as well as Conditions (8)-(10) above, as set forth in Table 12 below.

TABLE 12

| Condition No. | Condition | Value |
|---|---|---|
| (1) | $-3.5 < f_1/f < -1.2$ | −1.81 |
| (2), (8) | $3.0 < f_2/f < 8.0$<br>$5.0 < f_2/f < 8.0$ | 6.23 |
| (3), (9) | $3.5 < D_{G1G2}/f$<br>$6.0 < D_{G1G2}/f$ | 9.18 |
| (4), (10) | $2.5 < Bf/f$<br>$4.0 < Bf/f$ | 6.43 |
| (5) | $-8.0 < f_{TC1}/f < -3.0$ | −4.42 |
| (6) | $-0.15 < f/f_{TC2} < 0.1$ | −0.07 |
| (7) | $1.77 < N_d$ | 1.834 |

Figure 9A:
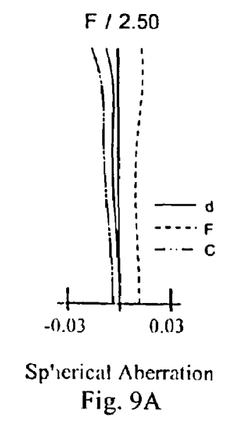
FIGS. 9A-9D show the spherical aberration, astigmatism, distortion, and lateral color, respectively, of the projection lens of Embodiment 4 of the present invention.
Figure 9B:
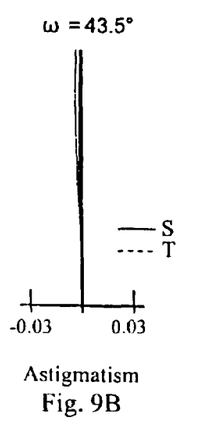
Figure 9C:
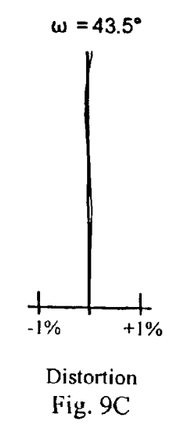
Figure 9D:
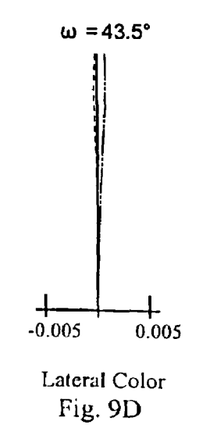

FIGS. 9A-9D show the spherical aberration, the astigmatism, the distortion (in %), and the lateral color, respectively, of the projection lens of Embodiment 4. In FIG. 9A, the spherical aberration is shown for the d-line ($\lambda=587.6$ nm), the F-line ($\lambda=486.1$ nm), and the C-line ($\lambda=656.3$ nm) at a maximum f-number of 2.50. FIGS. 9B-9D show the astigmatism, distortion, and lateral color, respectively, at a half-field angle of 43.5 degrees. In FIG. 9B, the astigmatism is shown for both the sagittal image surface S and the tangential image surface T for the d-line ($\lambda=587.6$ nm). In FIG. 9D, the lateral color is shown for the F-line ($\lambda=486.1$ nm) and the C-line ($\lambda=656.3$ nm) relative to the d-line ($\lambda=587.6$ nm).

As is clear from FIGS. 9A-9D, the projection lens of Embodiment 4 provides a wide-angle half-field angle of 43.5 degrees, a bright projection with a maximum f-number of 2.50, and favorably corrects aberrations, including distortion and lateral color.

The projection lens of the present invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values may be adopted.

Additionally, the projection display device of the present invention is not limited to the projection lenses of the embodiments described above nor to the other features of the projection display devices described above, as many variations fall within the scope of the present invention. For example, as light valves, transmissive or reflective liquid crystal display elements may be used, or very small mirrors that are able to change their inclination about a roughly planar surface, such as digital micromirror arrays, may be used. Also, various different illumination optical systems, which may be chosen based on the particular light valves being used, may be used in various projection display devices. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection lens having a magnification side and a reduction side opposite the magnification side and comprising two lens groups, arranged in order from the magnification side along an optical axis, as follows:

a first lens group having negative refractive power; and a second lens group having positive refractive power; wherein the distance along the optical axis between said first lens group and said second lens group is greater than the distance between any two adjacent optical surfaces of the projection lens;

each of said first lens group and said second lens group includes at least one lens component that is formed of three lens elements; and the following conditions are satisfied $$-3.5 < f_1/f < -1.2$$

$$3.0 < f_2/f < 8.0$$

$$3.5 < D_{G1G2}/f$$

$$2.5 < Bf/f$$

where $f_1$ is the focal length of said first lens group;

f is the focal length of the entire projection lens;

$f_2$ is the focal length of said second lens group;

$D_{G1G2}$ is the distance along the optical axis between said first lens group and said second lens group; and Bf is the air-equivalent distance along the optical axis between the lens surface on the reduction side of said second lens group and the image plane of the projection lens on the reduction side of the projection lens.

2. The projection lens of claim 1, wherein:
said at least one lens component of said second lens group is formed by a lens element having negative refractive power that is positioned between two lens elements having positive refractive power; and
the following conditions are satisfied:

$$-0.15 < f/f_{TC2} < 0.1$$

$$1.77 < N_d$$

where
f is defined as set forth previously;
$f_{TC2}$ is the focal length of said at least one lens component of said second lens group; and
$N_d$ is the refractive index at the d-line of said lens element having negative refractive power.

3. The projection lens of claim 1, wherein:
said at least one lens component of said first lens group is formed by a lens element having positive refractive power that is positioned between two lens elements having negative refractive power;
said at least one lens component of said first lens group is positioned at the reduction side end of said first lens group; and
the following condition is satisfied:

$$-8.0 < f_{TC1}/f < -3.0$$

where
$f_{TC1}$ is the focal length of said at least one lens component of said first lens group; and
f is defined as set forth previously.

4. The projection lens of claim 1, wherein the following conditions are satisfied:

$$5.0 < f_2/f < 8.0$$

$$6.0 < D_{G1G2}/f$$

$$4.0 < Bf/f$$

where
$f_2$, f, $D_{G1G2}$, and Bf are defined as set forth previously.

5. The projection lens of claim 1, wherein said first lens group includes, arranged in order from the magnification side, a lens element having little refractive power and at least one aspheric surface, a lens element having negative refractive power, having a meniscus shape, and having a concave surface on the reduction side, and a lens component formed by a biconvex lens element positioned between two lens elements having negative refractive power.

6. The projection lens of claim 1, wherein a deflector for deflecting the optical path of the projection lens is positioned between said first lens group and said second lens group.

7. The projection lens of claim 1, wherein:
the lens element on the magnification side end of said first lens group is movable along the optical axis relative to other lens elements of said first lens group and includes an aspheric surface for correcting for curvature of field resulting from the change in the projection distance; and
a lens element within said second lens group includes an aspheric surface.

8. The projection lens of claim 1, wherein said first lens group is moved along said optical axis during focusing of the projection lens.

9. A projection display device including the projection lens of claim 1 and a light source providing a light beam that is guided through a light valve that modulates the light beam before the light beam passes through the projection lens and is projected onto a screen.

10. A projection lens having a magnification side and a reduction side opposite the magnification side and comprising two lens groups, arranged in order from the magnification side along an optical axis, as follows:
a first lens group having negative refractive power; and
a second lens group having positive refractive power;
wherein
the distance along the optical axis between said first lens group and said second lens group is greater than the distance between any two adjacent optical surfaces of the projection lens;
said first lens group includes a lens component on the reduction side end of said first lens group that is formed by a lens element having positive refractive power that is positioned between two lens elements having negative refractive power;
the projection lens is telecentric or nearly telecentric on the reduction side; and
the following conditions are satisfied:

$$-3.5 < f_1/f < -1.2$$

$$3.0 < f_2/f < 8.0$$

$$3.5 < D_{G1G2}/f$$

$$2.5 < Bf/f$$

$$-8.0 < f_{TC1}/f < -3.0$$

where
$f_1$ is the focal length of said first lens group;
f is the focal length of the entire projection lens;
$f_2$ is the focal length of said second lens group;
$D_{G1G2}$ is the distance along the optical axis between the first lens group $G_1$ and the second lens group $G_2$;
Bf is the air-equivalent distance along the optical axis between the lens surface on the reduction side of said second lens group and the image plane of the projection lens on the reduction side of the projection lens; and
$f_{TC1}$ is the focal length of said lens component.

11. The projection lens of claim 10, wherein the following conditions are satisfied:

$$5.0 < f_2/f < 8.0$$

$$6.0 < D_{G1G2}/f$$

$$4.0 < Bf/f$$

where
$f_2$, f, $D_{G1G2}$, and Bf are defined as set forth previously.

12. The projection lens of claim 10, wherein said first lens group includes, arranged in order from the magnification side, a lens element having little refractive power and at least one aspheric surface, a lens element having negative refractive power, having a meniscus shape, and having a concave surface on the reduction side, and a lens component formed by a biconvex lens element positioned between two lens elements having negative refractive power.

13. The projection lens of claim 10, wherein a deflector for deflecting the optical path of the projection lens is positioned between said first lens group and said second lens group.

14. The projection lens of claim 10, wherein:
the lens element on the magnification side end of said first lens group is movable along the optical axis relative to other lens elements of said first lens group and includes an aspheric surface for correcting for curvature of field resulting from the change in the projection distance; and a lens element within said second lens group includes an aspheric surface.

15. The projection lens of claim 10, wherein said first lens group is moved along said optical axis during focusing of the projection lens.

16. A projection display device including the projection lens of claim 10 and a light source providing a light beam that is guided through a light valve that modulates the light beam before the light beam passes through the projection lens and is projected onto a screen.

17. A projection lens having a magnification side and a reduction side opposite the magnification side and comprising two lens groups, arranged in order from the magnification side along an optical axis, as follows:

a first lens group having negative refractive power; and
a second lens group having positive refractive power;

wherein the distance along the optical axis between said first lens group and said second lens group is greater than the distance between any two adjacent optical surfaces of the projection lens;

said second lens group includes at least one lens component that is formed by a lens element having negative refractive power that is positioned between two lens elements having positive refractive power;

the projection lens is telecentric or nearly telecentric on the reduction side; and the following conditions are satisfied:

$$-3.5 < f_1/f < -1.2$$

$$3.0 < f_2/f < 8.0$$

$$3.5 < D_{G1G2}/f$$

$$2.5 < Bf/f$$

$$-0.15 < f/f_{TC2} < 0.1$$

$$1.77 < N_d$$

where $f_1$ is the focal length of said first lens group;
f is the focal length of the entire projection lens;
$f_2$ is the focal length of said second lens group;
$D_{G1G2}$ is the distance along the optical axis between the first lens group $G_1$ and the second lens group $G_2$;
Bf is the air-equivalent distance along the optical axis between the lens surface on the reduction side of said second lens group and the image plane of the projection lens on the reduction side of the projection lens;
$f_{TC2}$ is the focal length of said at least one lens component of said second lens group; and $N_d$ is the refractive index of the material of said lens element having negative refractive power.

18. The projection lens of claim 17, wherein:

said first lens group includes a lens component on the reduction side end of said first lens group that is formed by a lens element having positive refractive power that is positioned between two lens elements having negative refractive power, and the following condition is satisfied:

$$8.0 < f_{TC1}/f < -3.0$$

where $f_{TC1}$ is the focal length of said lens component of said first lens group; and f is defined as set forth previously.

19. The projection lens of claim 17, wherein the following conditions are satisfied:

$$5.0 < f_2/f < 8.0$$

$$6.0 < D_{G1G2}/f$$

$$4.0 < Bf/f$$

where $f_2$, $f$, $D_{G1G2}$, and Bf are defined as set forth previously.

20. The projection lens of claim 17, wherein said first lens group includes, arranged in order from the magnification side, a lens element having little refractive power and at least one aspheric surface, a lens element having negative refractive power, having a meniscus shape, and having a concave surface on the reduction side, and a lens component formed by a biconvex lens element positioned between two lens elements having negative refractive power.

21. The projection lens of claim 17, wherein a deflector for deflecting the optical path of the projection lens is positioned between said first lens group and said second lens group.

22. The projection lens of claim 17, wherein:

the lens element on the magnification side end of said first lens group is movable along the optical axis relative to other lens elements of said first lens group and includes an aspheric surface for correcting for curvature of field resulting from the change in the projection distance; and a lens element within said second lens group includes an aspheric surface.

23. The projection lens of claim 17, wherein the first lens group is moved along said optical axis during focusing of the projection lens.

24. A projection display device including the projection lens of claim 17 and a light source providing a light beam that is guided through a light valve that modulates the light beam before the light beam passes through the projection lens and is projected onto a screen.

* * * * *